Patented Mar. 13, 1951

2,544,892

UNITED STATES PATENT OFFICE 2,544,892

PRINTING VAT DYES ON POLYACRYLONITRILE FABRICS USING POTASSIUM THIOCYANATE

Charles Franklin Miller, Boothwyn, Pa., assignor to E. I. du Pont de Nemours & Company, Wilmington, Del., a corporation of Delaware No Drawing. Application February 21, 1948, Serial No. 10,201

1 Claim. (Cl. 8—70)

This invention relates to improved vat dyestuff printing compositions and relates more particularly to vat dyestuff printing compositions containing potassium thiocyanate and to a process for printing acrylonitrile polymers with such compositions.

Acrylonitrile polymers, containing a major portion of acrylonitrile, such as copolymers made from at least 85% by weight of acrylonitrile and not more than 15% of other polymerizable vinyl type monomers, have many desirable properties for such purposes as textile fibers, films, bristles, tubings, molded articles and the like, but have the disadvantage of being difficult to print with conventional printing compositions and procedures. Such acrylonitrile polymers are extremely hydrophobic so that vat colors printed on them with conventional printing compositions, using conventional methods, fail to give complete or satisfactory strength, brilliance and penetration. The term "acrylonitrile polymers," when used without further qualification in this specification, refers to the difficulty printed polymers containing at least 85% of polymerized acrylonitrile.

While the use of thiocyanates has been suggested to improve the receptivity of cellulose acetate fibers for dyes, the same conditions are not generally applicable to the printing of vat colors on acrylonitrile polymers. The composition of printing pastes suggested has not been such as to produce desirable results with the more difficultly printed acrylonitrile polymers. In particular the ammonium thiocyanate considered preferable for printing cellulose acetate decomposes in the presence of alkali carbonates used in preparing vat color compositions for printing on acrylonitrile polymers and is unsatisfactory for use. For some unexplained reason sodium and lithium thiocyanate, which might be thought suitable as avoiding the above disadvantage of ammonium thiocyanate, have the property of reacting upon acrylonitrile polymers to produce stiff, boardy printed areas that have a tendency to crock, crack excessively and produce a completely unsatisfactory "hand" or feel on textile fabrics.

It is an object of the present invention to provide a vat dyestuff printing composition which will successfully print acrylonitrile polymers containing at least 85% by weight of polymerized acrylonitrile and, in the case of textile fabrics formed of such polymers, will give prints of greatly increased strength, brilliance and penetration, and will leave the printed area of the material with a soft, supple and entirely satisfactory "hand" or feel. A further object of the invention is to provide a process for printing such polymers, including textile fabrics formed of the polymers, with the improved printing composition to obtain the above results. Other objects of the invention will become apparent from the specification and claims.

In accomplishing the objects of the invention a printing paste composition is prepared containing a vat dyestuff, about 10% to about 25% of potassium thiocyanate and sufficient of a vat color thickener to produce a composition of suitable printing consistency. An acrylonitrile polymer, containing a major portion of acrylonitrile, is printed with the composition by any of the standard methods such as machine roller printing, screen printing, or brushing. The print is dried, aged for a few minutes by steaming, oxidized at an elevated temperature with a dilute solution of an oxidizing agent, rinsed, and soaped at an elevated temperature with dilute soap solution. It is the surprising discovery of this invention that the use of potassium thiocyanate, in accordance with this invention, improves the receptivity of acrylonitrile polymers for vat dyestuffs sufficiently to enable the dyestuff to impregnate the surface of the polymer and make possible color prints of strength and brilliance, while at the same time avoiding the difficulties with other thiocyanate salts alluded to above. Potassium thiocyanate appears to be unique in this property.

The new printing composition and process are illustrated by the following examples, which are not to be construed as limitative:

*Example 1*

A thickener is first prepared containing the following ingredients:

| | Parts by weight |
|---|---|
| Potassium carbonate | 150 |
| Sodium sulfoxylate formaldehyde | 150 |
| British gum (35% aqueous paste) | 700 |
| | 1000 |

In place of the British gum, aqueous pastes of other thickening agents such as crystal gum, karaya, prepared textile gums such as "Siltex Gum Brilliant ER" (prepared in accordance with U. S. Patent 1,990,330), or other suitable materials may be used.

The printing composition is prepared from the following ingredients:

| | Parts by weight |
|---|---|
| Sulfanthrene Orange R Paste (Color Index No. 1217) | 20 |
| Potassium thiocyanate | 15 |
| Thickener | 65 |
| | 100 |

The ingredients are thoroughly mixed until a homogeneous composition is obtained. The Sulfanthrene Orange R Paste, a thioindigoid type of vat dyestuff, contains 11.6% color solids, but it is understood that the proportion of color used in the printing composition varies according to the shade desired.

The composition is printed on a textile fabric made of an acrylonitrile polymer containing at least 85% of polymerized acrylonitrile, using the usual method for printing textile fabrics. The printed fabric is then dried, aged five minutes in a vat color ager, oxidized for ten minutes at 160° F. in 2% hydrogen peroxide solution, rinsed and soaped for five minutes with dilute soap solution at 180° F. A brilliant orange print is obtained which is unmistakably stronger and brighter than is obtained when using a printing paste from which the potassium thiocyanate is omitted. The handle of the cloth is not affected, whereas the handle is clearly inferior when sodium or lithium thiocyanate is used in place of potassium thiocyanate.

*Example 2*

| | Parts by weight |
|---|---|
| Sulfanthrene Navy Blue MR Paste (C. I. No. 1183) | 20 |
| Potassium thiocyanate | 20 |
| Thickener (as in Example 1) | 60 |
| | 100 |

The Sulfanthrene Navy Blue MR Paste is a halogenated indigoid type of vat dyestuff containing 20.4% color solids. When the above composition is printed on a textile fabric made of an acrylonitrile polymer containing at least 85% of polymerized acrylonitrile and processed as in Example 1, a deep navy blue print is obtained which is markedly brighter and stronger than is obtained in the absence of potassium thiocyanate. The handle of the fabric is not impaired.

*Example 3*

| | Parts by weight |
|---|---|
| Ponsol Jade Green Double Paste (C. I. No. 1101) | 15 |
| Potassium thiocyanate | 25 |
| Thickener (as in Example 1) | 60 |
| | 100 |

The Ponsol Jade Green Double Paste is an anthraquinone type of vat dyestuff containing 11.6% color solids. When the above composition is printed on a textile fabric made of an acrylonitrile polymer and processed as in Example 1, a green print of outstanding strength and brilliance is obtained. The handle of the fabric is entirely satisfactory.

Other typical vat colors which may be used in accordance with this invention in the manner described include the following:

Ex. 4. Ponsol Golden Orange 2RT Paste (C. I. No. 1098).

Ex. 5. Ponsol Brilliant Violet 4RN Paste (C. I. No. 1104).

Ex. 6. Sulfanthrene Red 3B Paste (C. I. No. 1212).

Ex. 7. Sulfanthrene Pink FB Paste (C. I. No. 1211).

Ex. 8. Sulfanthrene Pink FF Paste (Prototype 109).

Ex. 9. Sulfanthrene Brown G Paste (Prototype 121).

As oxidizing agents, other common oxidizing agents besides hydrogen peroxide may be used, such as sodium perborate, potassium bichromate, persulfates, chlorites and arylsulfonchloramides.

The acrylonitrile polymers which are used for the preparation of the shaped articles described in this invention should be of sufficiently high molecular weight to possess filament-forming (or film-forming) properties. The polymers generally employed possess an average molecular weight within the range of 25,000 to 750,000 or higher, and preferably between 40,000 and 250,000, as calculated in the usual manner from viscosity measurements by the Staudinger equation. It is to be understood, however, that shaped articles formed from polymers having molecular weights outside of the above ranges may be printed successfully in accordance with this invention.

Shaped articles such as textile fibers, films, bristles, tubings, and molded articles may be prepared by the usual techniques. For example, yarns or fibers may be prepared by dry spinning or wet spinning according to the procedures described in copending applications, Serial Numbers 496,376, now Patent 2,426,719, 735,666, now Patent 2,451,420, and 746,651, now Patent 2,467,553. Films may be prepared in similar ways or by casting methods. Fabrics may be formed from the yarns or fibers by any of the well-known knitting or weaving techniques.

This invention provides a convenient and valuable method for printing articles prepared from acrylonitrile polymers. By the use of the novel compositions of this invention, the difficultly printed acrylonitrile polymers can be printed effectively at a rapid rate using standard commercial equipment. It is seen from the examples that, on textile fabrics formed from these polymers, prints of brilliance and strength may be obtained without impairing the handle or feel of the fabric. The printed area remains as soft and supple as before printing. The receptivity of the acrylonitrile polymers for vat dye stuffs is unmistakably improved, making possible desirable prints when satisfactory prints could not be obtained by ordinary vat dyestuff printing compositions.

As many apparently widely different embodiments of this invention may be made without departing from the spirit and scope thereof, it is to be understood that the invention is not limited to the specific illustrations thereof except as defined in the appended claim.

What is claimed is:

A process for obtaining vat color prints of brilliance and strength on textile fabrics made of acrylonitrile polymer containing at least 85% of polymerized acrylonitrile without affecting the handle of the fabric which comprises printing on said polyacrylonitrile textile fabric with a composition consisting essentially of a vat dyestuff, 15% to 25% of potassium thiocyanate and 60% to 65% of a thickener consisting of potassium carbonate and sodium sulfoxylate formaldehyde incorporated in an aqueous paste of a gum thickening agent, then drying the print, aging the print for a few minutes by steaming, exposing the print to a dilute solution of an oxidizing agent at an elevated temperature for a few minutes, and then rinsing and soaping the printed fabric at an elevated temperature with dilute soap solution to produce the finished print.

CHARLES FRANKLIN MILLER.

REFERENCES CITED

The following references are of record in the file of this patent:

UNITED STATES PATENTS

| Number | Name | Date |
|---|---|---|
| 1,398,357 | Briggs | Nov. 29, 1921 |
| 2,289,461 | Salvin | July 14, 1942 |
| 2,322,323 | Seymour | June 22, 1943 |
| 2,333,204 | Seymour | Nov. 2, 1943 |
| 2,385,885 | Seymour | Oct. 2, 1945 |
| 2,404,727 | Houtz | July 23, 1946 |
| 2,428,836 | Scull | Oct. 14, 1947 |
| 2,431,956 | Moody | Dec. 2, 1947 |

OTHER REFERENCES

Rayon Textile Mo. for September 1946, page 140 (496).